United States Patent Office 3,836,442
Patented Sept. 17, 1974

3,836,442
PROCESS FOR RECOVERING MERCURY
FROM BRINE SOLIDS
Warren E. Dean and William E. Makris, New Martinsville, W. Va., assignors to PPG Industries, Inc., Pittsburgh, Pa.
No Drawing. Filed July 20, 1972, Ser. No. 273,587
Int. Cl. C01b 17/20; C01d 1/08
U.S. Cl. 204—99                              7 Claims

ABSTRACT OF THE DISCLOSURE

Mercury is removed from electrolytic cell solids, comprising magnesium hydroxide, ferric hydroxide, and calcium carbonate, by contacting the solids with an aqueous sulfide solution to form soluble mercury polysulfide. In a preferred embodiment, the mercury containing solids are first treated with a hypochlorite oxidizing agent.

---

In the operation of a mercury electrolytic cell, a sodium or potassium chloride brine containing from about 310 to 330 grams per liter of sodium chloride or 320 to 350 grams per liter of potassium chloride is passed between a mercury cathode and a graphite anode. The process is conducted in two steps from which the products sodium hydroxide and hydrogen are ultimately recovered but this invention is concerned with the first step or primary cell reaction in which sodium chloride and mercury are caused to liberate sodium amalgam and chlorine. Because, as mined, the brine contains varying quantities of calcium, magnesium, iron, and other impurities, the brine is treated to remove these contaminants by precipitation. Accordingly, sodium carbonate and sodium hydroxide are added in order to insolubilize the contaminants in the form of precipitates of calcium carbonate, magnesium hydroxide, and ferric hydroxide. In the primary cell, the brine is depleted to about 280 grams per liter of sodium chloride or potassium chloride brine so that it is taken to a saturator where the salt concentration is built back up to 310 to 330 grams per liter. The brine which is saturated with chlorine and which contains the aforesaid contaminants is then dechlorinated such as by vacuum flash and/or air-stripping and made alkaline to precipitate out the calcium, magnesium, and iron. The brine is then filtered to remove the precipitate and made acid again so that it can be recirculated to the mercury electrolytic cell. Unfortunately, however, the mercury in solution, present either as the mercuric ion or as mercury metal with a valence of 0, has an affinity for the solids so that the mercury is adsorbed or otherwise combined with the solids contributing to mercury pollution when these solids are discarded. Attempts to remove the mercury from the solids have been less than satisfactory. For example, water washing has been only moderately successful.

It has now been discovered that substantially complete mercury can be recovered from these solids by contacting said solids with an aqueous sulfide solution to solubilize the mercury ion as mercury polysulfide and preferably separately contacting said solids with an oxidizing agent to oxidize mercury metal to mercury ion prior to the addition of the aqueous sulfide and recovering the soluble mercury polysulfide. In a preferred embodiment, the mercury polysulfide is oxidized to form the insoluble mercury sulfide.

An aqueous solution of any soluble sulfur compound which will provide sulfide ion in the solution can be employed to form the mercury polysulfides. Exemplary of suitable compounds are the alkali metal sulfides such as sodium sulfide, potassium sulfide, and lithium sulfide; the alkaline earth metal sulfides such as magnesium sulfide, calcium sulfide, strontium sulfide, beryllium sulfide; a hydro sulfide such as sodium hydrosulfide; or hydrogen sulfide can be bubbled directly into a caustic solution.

Inasmuch as the solids from a mercury electrolytic cell can contain a number of other materials which are reactive with sulfide ion such as magnesium, silicon, calcium, barium, strontium, zinc, iron, manganese, boron, aluminum, lead, tin, chromium, copper, nickel, silver, vanadium, and germanium, the aqueous sulfide solution must be added in an amount sufficient to combine or react with said materials and still have an excess of sulfide ion over that required to combine with the mercury present.

The mercury sulfide which is formed is generally mercuric sulfide and, thus, 1 mole of sulfide ion per mole of mercury ion would provide a stoichiometric equivalent. An excess of sulfide ion is required to form mercury polysulfide. Thus, it is preferred that in excess of about 10 moles of sulfide ion per mole of mercury ion be present, up to about $10^{11}$ moles of sulfide ion per mole of mercury ion.

Because the amount of mercury and other materials reactive with sulfide ion is small in the solids, the aqueous sulfide solution will generally have a large excess of sulfide ion over that required to combine with the mercury and other cations. The sulfide ion concentration will commonly be between about 10 and about 50 grams per liter and the mercury concentration in the solids between about 10 and 1000 parts per million. After the soluble mercury polysulfide is formed and the solution removed from the solids, it is desirable to oxidize the mercury polysulfide to insoluble mercury sulfide to facilitate precipitation of the mercury. The oxidation can be accomplished by conventional means such as by air exposure in a pond or by allowing the mercury polysulfide solutions to fall from a spray tower through the atmosphere.

Because the amount of sulfide ion in solution is generally large and, accordingly, the time required for oxidation long, it is preferred that the solution be slurried with mercury containing solutions until the excess sulfide ion is reduced to low levels such as about one part per million.

The pH of the solution should be alkaline or between about 10 and about 14 in order to form the soluble mercury polysulfide, and prevent the solids such as magnesium hydroxide, calcium carbonate and iron hydroxide from going into solution. A preferred pH is between about 11 and about 14. The reaction can be conveniently conducted at ambient temperature or between about 15 and about 100° C.

In a preferred embodiment, an oxidizing agent such as an aqueous hypochlorite solution is contacted with the solids to oxidize any mercury metal to mercury ion and prevent the reduction of mercury ion to mercury metal. Other oxidizing agents which can be employed include: permanganates such as potassium permanganate; and persulfates such as sodium persulfate. Hypochlorite is preferred because it is the least expensive. Exemplary of suitable hypochlorites are the aqueous alkali metal and alkaline earth metal hypochlorites such as sodium, potassium and calcium hypochlorite commercially available in a 5 percent solution. Inasmuch as only a small percentage of the mercury present is in the form of mercury ion, it is only necessary that a small amount of oxidizing agent be employed such as about 0.1 percent. The amount of sulfur compound and oxidizing agent added, however, will depend upon the particular solids and their mercury content. This can be determined by routine analytical methods, however, and accordingly the invention lies not in the amounts of sulfur compound and oxidizing agent employed or the particular oxidizing agent or sulfur compound employed. Rather the invention lies in the particular steps of adding sulfur compounds to recover the mercury from the solids, preferably preceded by an oxidizing agent.

In a further preferred embodiment, the resulting mercury polysulfide solution generally having a concentration of 10 to 50 grams per liter is used to treat mercury-containing brines to precipitate mercury sulfide.

The following examples will serve to illustrate the invention and its preferred embodiments. All parts and percentages in said examples are by weight unless otherwise indicated.

EXAMPLE 1

To 200 milliliters of solution containing 50 grams per liter of sodium hydrosulfide at a pH of 12.5 and temperature of 25° C., wet brine solids from a mercury electrolytic cell were added of magnesium hydroxide, calcium carbonate, ferric hydroxide, filter coating, and other insolubles together with 1.2 milligrams of mercury and mercury-containing salts. These were stirred together for 16 hours. After separation of the wet solids from the solution, they were found to contain 0.1 milligram mercury. This indicated 92 percent of the mercury was in the liquid phase as the complex soluble mercury polysulfide ion.

EXAMPLE 2

A brine from a mercury electrolytic cell having a sodium chloride content of 300 grams per liter, a pH of about 1.5 and 3,830 micrograms of mercury was adjusted to a pH of 7 by the addition of sodium hydroxide and then 0.57 gram of calcium chloride and 0.79 gram of magnesium chloride hexahydrate per liter of brine were added. Sufficient sodium hypochlorite was then added to provide 0.006 gram per liter NaOCl in the brine for the purpose of oxidizing any mercury metal to mercury ion. The brine was then treated with 0.66 gram of sodium hydroxide and 1.19 gram of sodium carbonate and the solution was agitated for 2 hours and filtered. The solids were then treated with a plurality of samples of 1 molar sodium sulfide solution to complex the mercury as the polysulfide. The results are shown in the following Table I wherein samples 1 through 4 were 1 liter brine samples and sample No. 5 was a six liter sample. From a comparison of samples 1 and 2, it can be seen that approximately two-thirds of the mercury is removed from the solids by adding a small amount of hypochlorite to the brine prior to the precipitation and separation of the solids. From a comparison of samples 3, 4 and 5 with samples 1 and 2, it can be seen that the combined hypochlorite and sodium sulfide treatment results in the removal of from approximately 85 percent to substantially complete removal of the mercury on the solids.

TABLE I

| Sample number | (1) | (2) | (3) | (4) | (5) |
|---|---|---|---|---|---|
| Brine treatments* (ml.) | None | 5 | 5 | 5 | 30 |
| Reslurry solutions** (ml.) | None | None | 200 | 200 | 1,200 |
| Wt. of dry solids*** (g.) | 0.74 | 0.74 | 0.74 | 0.74 | 4.44 |
| Hg contents of solids (μg.) | 90.8 | 31 | 0.04 | 6.7 | 15.2 |
| Hg per dry solids (p.p.m.) | 123 | 42 | 0.054 | 9.05 | 3.43 |

*NaOCl solution containing 1.18 g./l. Cl$_2$ equivalent.
**1 M Na$_2$S solution—Sample No. 4 was wash of filter cake; numbers 3 and 5 were re-slurry.
*** Calculated.

EXAMPLE 3

To 200 milliliters of solution containing 300 grams per liter sodium chloride and 2.0 grams per liter sodium hypochlorite was added 10 grams of wet brine solids from a mercury electrolytic cell composed of magnesium hydroxide, calcium carbonate, ferric hydroxide, filter precoat and other insolubles and also containing 1.76 milligrams of mercury and mercury-containing salts. The mixture was stirred for 16 hours. The solids were then removed from the slurry by filtration and they were analyzed for mercury. The solids were found to contain 0.38 milligram of mercury indicating that 78.4 percent of the mercury had gone into the solution. These solids were again reslurried but in 200 milliliters of aqueous solution containing 50 grams per liter sodium hydrosulfide. This slurry was stirred for 2 hours. The solids were then removed from this sodium hydrosulfide solution by filtration and found to contain 6.6 parts per million mercury. This treatment of hypochlorite followed by sulfide washing removed 96.7 percent of the mercury from the initial solids.

Although the invention has been described with reference to the specific details of particular embodiments, it is not intended thereby to limit the scope of the invention except insofar as the specific details are recited in the appended claims.

We claim:

1. In the operation of a mercury electrolytic cell in which depleted sodium or potassium chloride brine containing about 280 grams per liter of sodium chloride or potassium chloride brine is passed to a saturator where the salt concentration is built back up to 310 to 330 grams per liter, the brine dechlorinated, and made alkaline to precipitate out contaminants such as calcium, magnesium, and iron as calcium carbonate, magnesium hydroxide, and ferric hydroxide, said contaminants combined with minor amounts of mercury ion or metal, the brine filtered to remove the precipitate and made acid again for recirculation to the mercury electrolytic cell, the improvement which comprises treating the precipitate having mercury ion or metal combined therewith with an excess of an aqueous basic sulfide solution to solubilize said mercury ion and mercury metal as mercury polysulfide, and recovering an aqueous mercury polysulfide solution from the precipitate.

2. The process of Claim 1 wherein the aqueous sulfide solution contains in excess of between about 10 and $10^{11}$ moles of sulfide ion per mole of mercury ion.

3. The process of Claim 1 wherein the pH of the aqueous sulfide solution is between about 10 and about 14.

4. The process of Claim 1 wherein the solids and aqueous sulfide solution are contacted at a temperature between about 15 and about 100° C.

5. The process of Claim 1 wherein the aqueous sulfide solution has a concentration between about 1 and about 100 grams per liter, the mercury ion and mercury metal present in the solids has a concentration between about 10 and about 1000 parts per million and the resultant aqueous mercury polysulfide solution is contacted with fresh mercury-containing solids until the amount of excess sulfide ion over mercury ion and metal is less than about 1 part per million and oxidizing the resultant mercury polysulfide to insoluble mercury sulfide.

6. A process for recovering mercury ion and metal from mercury electrolytic cell brine solids having one or more of magnesium hydroxide, ferric hydroxide and calcium carbonate, comprising contacting said solids with an alkaline aqueous sulfide solution having a pH between about 10 and about 14 at a temperature between about 15 and about 100° C. for a time sufficient to solubilize the mercury as an aqueous solution of mercury polysulfide, oxidizing said mercury polysulfide to produce insoluble mercury sulfide and recovering the resultant insoluble mercury sulfide.

7. A process for recovering mercury metal and mercury ion from mercury electrolytic cell brine solids having one or more of magnesium hydroxide, ferric hydroxide, calcium carbonate, filter coating, or other insolubles, comprising separately contacting said solids first with an aqueous oxidizing agent to oxidize said mercury metal to mercury ion and inhibit the reduction of mercury ion to mercury metal; and secondly with an aqueous alkaline sulfide solution to solubilize said mercury ion as an aqueous solution of mercury polysulfide.

References Cited

UNITED STATES PATENTS

| | | | |
|---|---|---|---|
| 3,718,457 | 2/1973 | Entwisle et al. | 423—561 X |
| 2,860,952 | 11/1958 | Bergeron et al. | 423—102 |
| 3,085,859 | 4/1963 | Scholten et al. | 204—99 X |
| 3,115,389 | 12/1963 | Deriaz | 204—99 X |
| 3,691,037 | 9/1972 | Updyke | 204—99 |

FOREIGN PATENTS

| | | | |
|---|---|---|---|
| 1,121,408 | 7/1968 | Great Britan | 204—99 |
| 45/14,667 | 5/1970 | Japan | 204—99 |

JOHN H. MACK, Primary Examiner

D. R. VALENTINE, Assistant Examiner

U.S. Cl. X.R.

423—562